Sept. 30, 1969     R. C. STAATS     3,469,457
ELECTROSTATICALLY SUPPORTED ROTOR FOR INERTIAL SYSTEM
Filed Dec. 5, 1962     4 Sheets-Sheet 1

INVENTOR.
ROBERT C. STAATS
BY
*Roger W Jensen*
ATTORNEY

INVENTOR.
ROBERT C. STAATS
ATTORNEY

FIG. 4

INVENTOR.
ROBERT C. STAATS
BY Roger W. Jensen
ATTORNEY

FIG. 6

INVENTOR.
ROBERT C. STAATS

United States Patent Office 3,469,457
Patented Sept. 30, 1969

3,469,457
ELECTROSTATICALLY SUPPORTED ROTOR FOR INERTIAL SYSTEM
Robert S. Staats, Fridley, Minn., assignor to Honeywell Inc., a corporation of Delaware
Filed Dec. 5, 1962, Ser. No. 242,549
Int. Cl. G01c 19/54
U.S. Cl. 74—5.4                                   25 Claims This invention relates to inertial instruments and more particularly to gyroscopes and accelerometers whose inertial members are suspended in electric fields between a plurality of electrodes.

Various schemes of supporting an inertial member of such an instrument by means of electrostatic fields have been so far developed and have attained some degrees of success. However, considerable errors are inherently present in these prior art devices due to the extreme sensitivity to electrode to inertial member gap variation, the electric torques introduced by spin axis misalignment and axial and radial mass unbalance.

The present invention successfully copes with these problems and accomplishes its objectives by providing an active three phase suspension system in which the suspension forces are completely independent of gap variation. It accomplishes this with electronics which are, in spite of improved control characteristics, simplier than prior art passive suspensions.

The suspension system or circuit consists of three pairs of constant current amplifiers with each pair connected between a pair of opposite suspension electrodes. The input to each pair of amplifiers are arranged so that the sum of the currents of each pair is constant and so that the three resultant sums of currents are separated in phase from each other by 120°. It was discovered that the electrostatic forces between the electrodes and the rotor are gap independent if the sums of the squares of the voltage gradients between the rotor and the two opposite electrodes of each pair can be made constant. This important discovery helps greatly to solve the problem of eliminating many of the errors introduced by the difficulty of duplicating physically an ideal mathematical model of the rotor and electrode structure. The drawback to the application of this discovery would now seem to be the complex electronics which prior art devices use for the purpose of generating square functions. This invention, however, also teaches how this can be accomplished without generating square functions.

It was also discovered that because the suspension forces are maintained independent of gap variation the currents through each electrode are also independent of the gap variation and that the current is directly proportional to the amount of acceleration applied on the rotor. This fact allows a gyro using the suspension system disclosed herein, to act as a very accurate accelerometer.

Not only does this invention provide a vastly improved electrostatic suspension for a gyroscope and an accurate three axis accelerometer, it allows a single (spin axis plus two sensing axes) inertial instrument to act both as a two-degree-of-freedom gyroscope and a three axis accelerometer at the same time.

It is therefore an object of this invention to provide an improved stable electrostatic suspension system for an inertial instrument.

A further object of this invention is to provide a high accuracy gyroscope.

Still another object of this invention is to provide an accurate accelerometer.

These and further objects will become apparent to those skilled in the art upon consideration of the accompanying specification, claims, and drawings of which:

Figure 1:
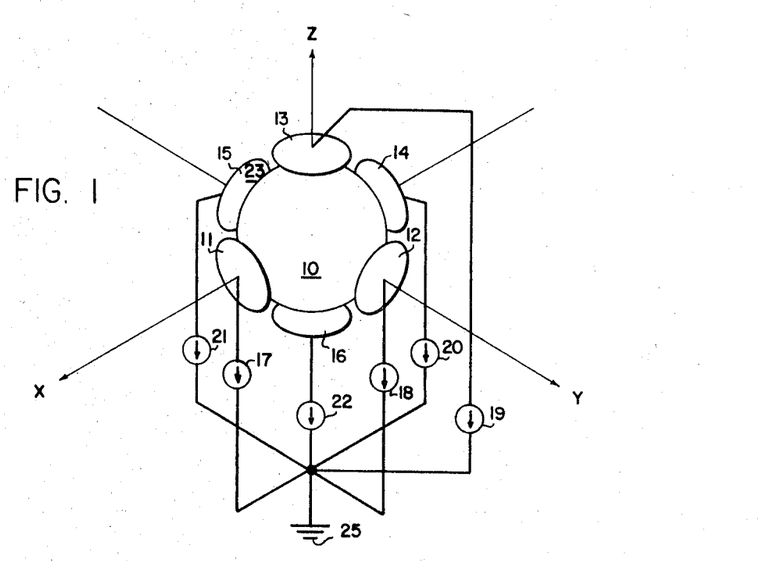
FIGURE 1 is a schematic diagram of a three phase suspension system comprising this invention.

Referring to FIGURE 1, a spherical inertial member or rotor 10 is surrounded by six electrically isolated electrodes 11, 12, 13, 14, 15, and 16 outlining a spherical cavity 23 with a radius somewhat larger than the radius of rotor 10. Current generators 17, 18, 19, 20, 21, and 22 are connected between electrodes 11, 12, 13, 14, 15, and 16 and ground 25 respectively.

Electrodes 11 and 14, 12, and 15, 13 and 16, each form an electrode pair with the two electrodes of each pair being diametrically opposed so that a straight line joining the geometric center of the two electrodes of each pair passes substantially through the center of the electrode cavity 23. The three axes of the three pairs are substantially normal to each other (orthogonal) and intersect each other at the center of the electrode cavity 23. The three axes are labeled $x$, $y$, and $z$; the $x$ axis being associated with electrodes 11 and 14, the $y$ axis being associated with electrodes 12 and 15, and the $z$ axis being associated with electrodes 13 and 16.

The sum of the currents at the two electrodes of each pair is always maintained constant and equal in magnitude to the sum of the currents of the other pairs, however, the three resultant equal magnitude currents are displaced from each other in phase by 120° or, in other words, they are equally spaced on a 360° phase plane. Consequently inertial member 10 is substantially at ground potential although no physical connection to ground is possible. For this reason, each channel is independent from the others and can be treated separately.

In application to a gyroscope the inertial member 10 would be rotating and can be referred to as a rotor, while in application to an accelerometer the inertial member may or may not be rotating. Hereafter the inertial member will be referred to as a rotor although it will be understood that the term also applies to a nonrotating member unless a gyroscopic application is specifically being discussed.

Figure 7:
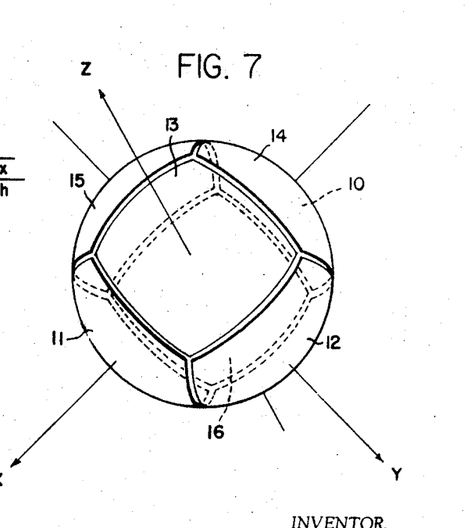
FIGURE 7 depicts one possible configuration of the electrode structure to be used with this invention.

For use of the invention in an application to a gyroscope, a means such as that shown in FIGURE 7 of the Nordsieck Patent 3,003,356 for initially spinning the inertial member about a spin axis and a pickoff means such as shown in the Kutz Patent 2,959,060 for measuring the relative motion of the spin axis of the inertial member and the housing bearing the supporting electrodes may be incorporated in the instrument. The spin-up and the pickoff means are not included in the present discussion, because they are not essential to the operation of this invention.

Figure 2:
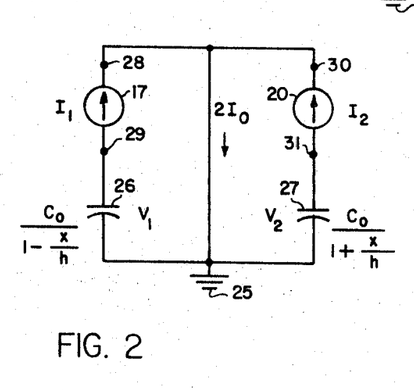
FIGURE 2 is a schematic diagram of one channel of the suspension system of FIGURE 1.

In FIGURE 2 one channel is shown with members corresponding to the $x$ axis channel of FIGURE 1. Current generator 17 has terminals 28 and 29. Terminal 29 of current generator 17 is connected to ground 25 through a capacitor 26 and terminal 28 of current generator 17 is connected directly to ground 25. In the same manner, current generator 20 has terminals 30 and 31. Terminal 31 of current generator 20 is connected through a capacitor 27 to ground 25 and terminal 30 is connected directly to ground 25. Capacitor 26 represents the electrode to rotor capacitance between electrode 11 and rotor 10 and capacitor 27 represents the electrode to rotor capacitance between electrode 14 and rotor 10.

Figure 3:
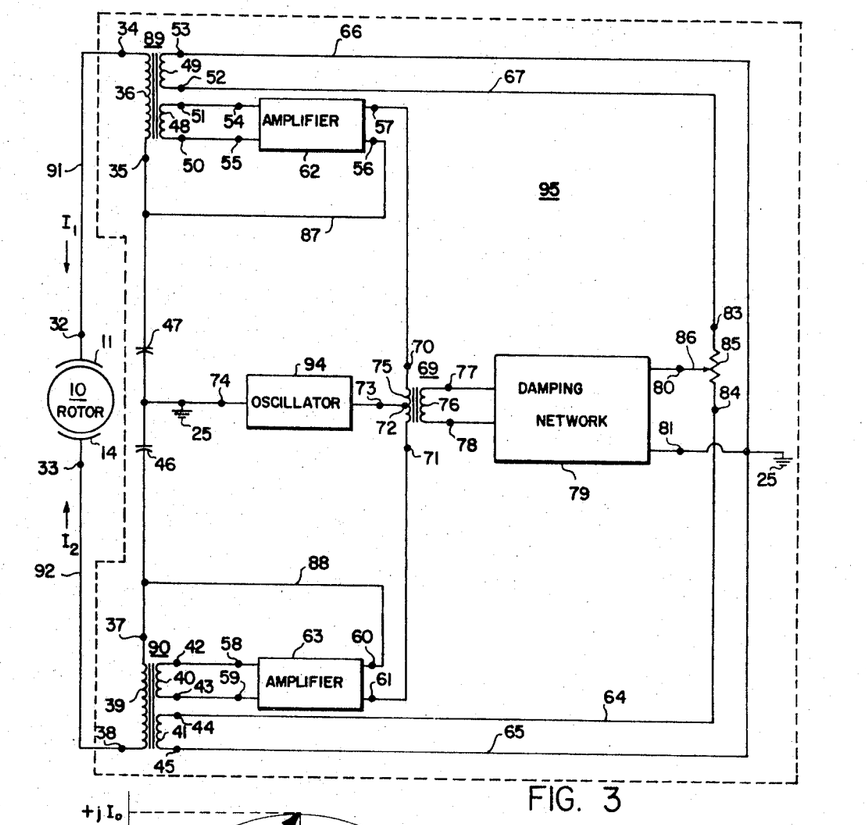
FIGURE 3 is a schematic diagram of one channel of the suspension system with electrodes energized by constant generators.

Referring now to FIGURE 3, an oscillator 94 has outputs 73 and 74. Output terminal 74 is connected directly to ground 25 and output terminal 73 is connected to a center tap 72 of a primary winding 75 of a transformer 69. Primary winding 75 of transformer 69 further has end terminals 70 and 71. Transformer 69 also has a secondary winding 76 with end terminals 77 and 78. End terminal 70 of primary winding 75 is connected to an input terminal 57 of an amplifier 62 and end terminal 71 of primary winding 75 is connected to an input terminal 61 of an amplifier 63. Amplifier 62 further has an input terminal 56 and output terminals 54 and 55. Output terminal 54 of amplifier 62 is connected to end terminal 51 of a primary winding 48 of a transformer 89. Primary winding 48 further has an end terminal 50 connected to output terminal 55 of amplifier 62. Transformer 89 also has a secondary winding 36 with end terminals 34 and 35 and a secondary winding 49 with end terminals 52 and 53. End terminal 35 of secondary winding 36 is connected to input terminal 56 of amplifier 62 by means of a conductor 87 and to ground 25 through a capacitor 47, while end terminal 34 of secondary winding 36 is connected to terminal 32 of an electrode 11 by means of a conductor 91.

Amplifier 63 also has an input terminal 60 and output terminals 58 and 59. Output terminal 58 is connected to an end terminal 42 of a primary winding 40 of a transformer 90. Primary winding 40 of transformer 90 also has an end terminal 43 connected directly to output terminal 59 of amplifier 63. Transformer 90 further has a secondary winding 39 with end terminals 37 and 38 and a secondary winding 41 with end terminals 44 and 45. End terminal 37 of secondary winding 39 is connected to input terminal 60 of amplifier 63 by means of a conductor 88 and to ground 25 through capacitor 46, and end terminal 38 of secondary winding 39 is connected to a terminal 33 of a rotor supporting electrode 14 by means of a conductor 92. An inertial member 10 is suspended between electrodes 11 and 14.

End terminal 53 of secondary winding 49 of transformer 89 is connected to ground 25 by means of a conductor 66 and end terminal 52 of secondary winding 49 is connected to an end terminal 83 of a potentiometer 85 by means of a conductor 67. Potentiometer 85 further has an end terminal 84 and a wiper 86. End terminal 44 of secondary winding 41 of transformer 90 is connected to end terminal 84 of potentiometer 85 through conductor 64 and end terminal 45 of secondary winding 41 is connected to ground 25 by means of a conductor 65. Wiper 86 is connected directly to an input terminal 80 of a damping network 79. Damping network 79 further has an input terminal 81 connected to ground 25. End terminals 77 and 78 of secondary winding 76 of transformer 69 are also output terminals of damping network 79. The complete circuit energizing electrodes 11 and 14, connected to electrodes 11 and 14 at terminals 32 and 33 respectively, comprise a suspension channel 95.

The function of the support channel shown in FIGURE 3 is to control the currents at electrodes 11 and 14 so that if the rotor moves the current decreases at the electrodes toward which the rotor moves and increases at the electrodes on the opposite side of the electrode cavity.

An improvement on the support channel shown in FIGURE 3 is to control the currents at the electrodes in such a way as to maintain the sum of the squares of the voltage gradients at the two electrodes of each pair substantially constant. This can be done by forcing the equality between the vector sum and the vector difference of the two currents in each electrode pair. A mathematical and graphical explanation of this will be made with reference to the operation of FIGURE 4, which is one possible mechanization of a support channel providing this improved control characteristic.

Figure 4:
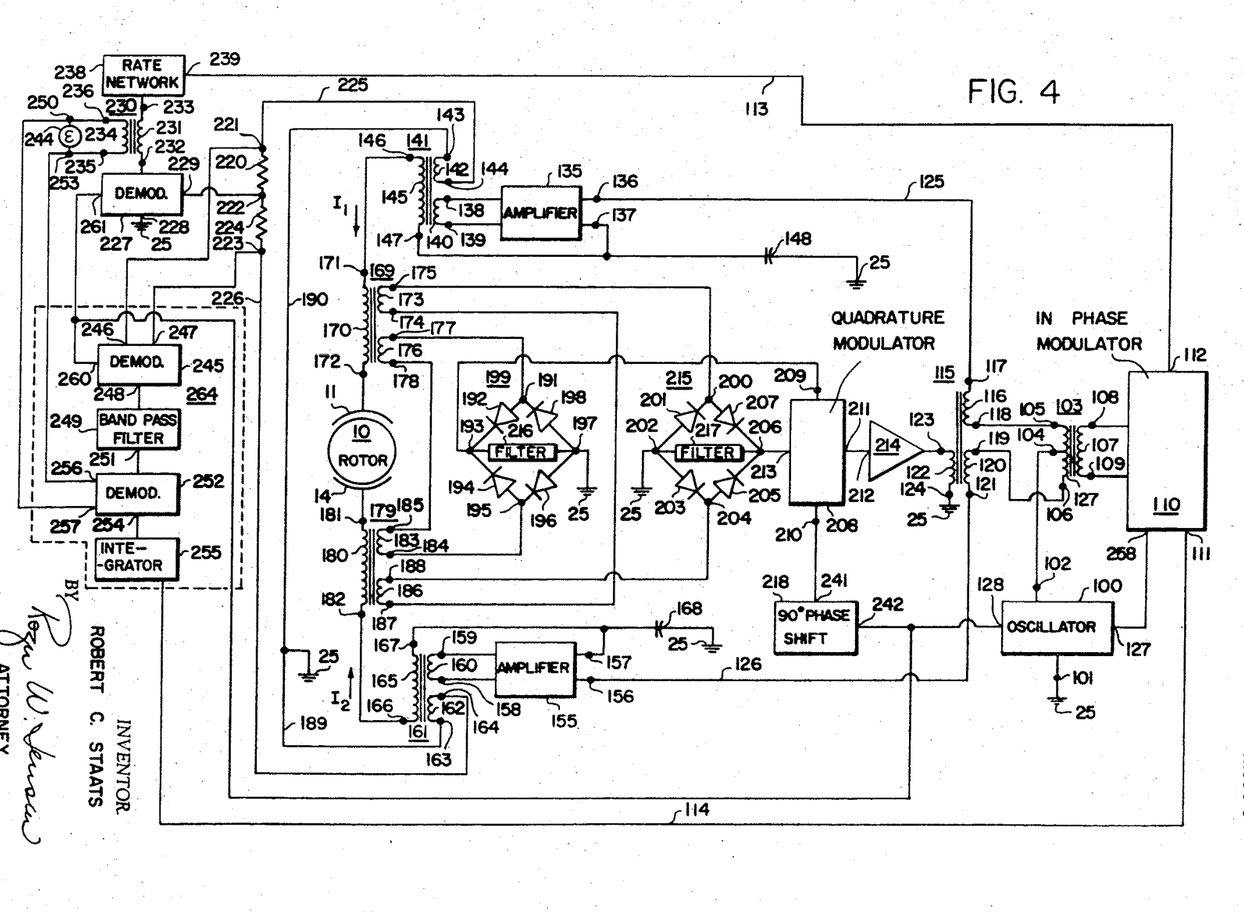
FIGURE 4 is a schematic diagram of one channel of the suspension system maintaining the sum of the squares of the field gradients constant.

In FIGURE 4 oscillator 100 has outputs 101, 102, 127, and 128. Output terminal 101 is connected directly to ground 25 and output terminal 102 is connected to a center tap 104 of a primary winding 127 of a transformer 103. Primary winding 127 also has end terminals 105 and 106. Transformer 103 further has a secondary winding 107 with end terminals 108 and 109. End terminal 105 of primary winding 127 is connected to an end terminal 118 of a secondary winding 116 of a transformer 115. Secondary winding 116 of transformer 115 further has an end terminal 117. Transformer 115 also has a primary winding 122 with end terminals 123 and 124 and a secondary winding 120 with end terminals 119 and 121. End terminal 117 of secondary winding 116 is connected to an input terminal 136 of an amplifier 135 by means of a conductor 125 and end terminal 121 of the secondary winding 120 of transformer 115 is connected to an input terminal 156 of an amplifier 155 by means of a conductor 126. End terminal 119 of secondary winding 120 is connected to the end terminal 106 of primary winding 127 of transformer 103. Amplifier 135 further has an input terminal 137 and output terminals 138 and 139. Output terminals 138 and 139 are also end terminals of primary winding 140 of a transformer 141. Transformer 141 also has a secondary winding 142 with end terminals 143 and 144 and secondary winding 145 with end terminals 146 and 147. End terminal 147 of primary winding 145 of transformer 141 is connected directly to input terminal 137 of amplifier 135 and to ground 25 through a capacitor 148 and the end terminal 146 of winding 145 is connected to an inertial member supporting electrode 11 through a primary winding 170 of a transformer 169.

Amplifier 155 also has an input 157 and output terminals 158 and 159. Output terminals 158 and 159 are also the end terminals of primary winding 160 of a transformer 161. Transformer 161 further has a secondary winding 165 with end terminals 166 and 167 and a secondary winding 162 with end terminals 163 and 164. End terminal 167 of secondary winding 165 is connected directly to the input terminal 157 of amplifier 155 and to ground 25 through a capacitor 168 and the end terminal 166 of secondary winding 165 is connected to an inertial member supporting electrode 14 through a primary winding 180 of transformer 179.

Transformer 169 further has a secondary winding 173 with end terminals 174 and 175 and secondary winding 176 with end terminals 177 and 178. Transformer 179 has a secondary winding 183 with end terminals 184 and 185 and a secondary winding 186 with end terminals 187 and 188. End terminal 178 of secondary winding 176 of transformer 169 is connected directly to end terminal 185 of secondary winding 183 of transformer 179. Terminal 177 of winding 176 of transformer 169 is connected to a terminal 191 of a full-wave rectifier diode bridge 199. Bridge 199 further has terminals 193, 195, and 197. A diode 198 is connected between terminals 197 and 191 in series with a diode 192 connected between terminals 191 and 193, the two diodes being oriented for forward current flow from terminal 197 to terminal 193. In the same way diode 196 is connected between terminals 197 and 195 in series a diode 194 connected between terminals 195 and 193, these diodes also being oriented for forward current flow from terminal 197 to terminal 193. Terminal 195 of bridge 199 is connected to terminal 184 of secondary winding 183 of transformer 179. A filter 216 is connected between terminals 193 and 197 to eliminate the ripple. Terminal 197 is also connected directly to ground 25.

Terminal 174 of secondary winding 173 of transformer 169 is connected directly to terminal 187 of secondary winding 186 of transformer 179. Terminal 175 of transformer 169 is connected to terminal 200 of full-wave rectifier diode bridge 215. Bridge rectifier 215 further has terminals 202, 204, and 206. The diode 201 is connected between terminals 202 and 200 of bridge rectifier 215 in series with a diode 207 connected between terminals 200 and 206. Diodes 201 and 207 are oriented so that the forward current flows from terminal 202 to terminal 206. A diode 203 is connected between terminal 202 and 204 in series with a diode 205 connected between terminals 204 and 206. Diodes 203 and 205 are oriented for current flow from terminal 202 to terminal 206. Terminal 202 is connected directly to ground 25 and the terminal 204 is connected to end terminal 188 of secondary winding 186 of transformer 179. Terminal 206 of bridge 215 is connected to an input 213 of a quadrature modulator 208. Quadrature modulator 208 can be any one of the suitable standard modulators well known to those skilled in the art. The reference signal for modulator 208 is obtained from oscillator 100 and passed through a 90° phase-shift network so that there is a 90° phase relationship between the output signal of quadrature modulator 208 and the output signal of oscillator 100. The adjective quadrature signifies this 90° phase relationship. Quadrature modulator 208 further has inputs 209 and 210 and an output 211. Input 209 of quadrature modulator 208 is connected to a terminal 193 of bridge rectifier 199. Input 210 of quadrature modulator 208 is connected to an output 241 of a 90° phase shift network 218. The phase shift network 218 also has an input 242 connected to an output terminal 128 of oscillator 100. Output 211 of quadrature modulator 208 is connected directly to an input 212 of amplifier 214. Amplifier 214 also has an output 123 connected to one end of winding 122 of transformer 115. End terminal 124 of winding 122 is connected directly to ground 25.

End terminal 143 of secondary winding 142 of conductor 190 of transformer 141 is connected to ground 25 by means of a conductor 190 and the end terminal 144 of winding 142 is connected to a terminal 221 by means of a conductor 225. Resistor 220 is connected from terminal 221 to terminal 222. A resistor 224 is connected in series with resistor 220 from terminal 222 to terminal 223. Terminal 223 is connected to end terminal 164 of secondary winding 162 of transformer 161 by means of a conductor 216. End terminal 163 of winding 162 is connected to ground 125 by means of a conducting lead 189.

Terminal 221 of resistor 220 is connected to an input 246 of a demodulator 245. Demodulator 245 further has inputs 247 and 260 and an output 248. Output 248 of demodulator 245 is connected to the input of a band pass filter 249. Output 251 of band pass filter 249 is connected to an input 253 of a demodulator 252. Demodulator 252 also has inputs 256 and 257 and an output 254. Output 254 of demodulator 252 is connected to an input 256 of an integrator 255. Integrator 255 further has an output 257 connected to an input 111 of an in-phase modulator 110 by means of a conductive lead 114. Demodulator 245, band pass filter 249, demodulator 252, and integrator 255 together with signal generator 244 and transformer 230 comprise an automatic sag control network 264. The in-phase modulator 110 is of the same type as the quadrature modulator 208 except that the reference signal is in phase with the output signal of oscillator 100.

In-phase modulator 110 further has an input 112 and an input 258. It also has output terminals 108 and 109. Output terminals 108 and 109 are also the end terminals of winding 107 of transformer 103. Input terminal 258 of in-phase modulator 110 is connected to the output terminal 127 of oscillator 100. The junction terminal 222 between resistors 220 and 224 is connected to an input terminal 229 of demodulator 227. Demodulator 227 further has an input terminal 228 connected to ground 25 and an output terminal 232 connected to the winding 231 of transformer 230. Demodulator 227 also has an input 261 connected directly to the input 260 of demodulator 245 and also directly to the output terminal 128 to oscillator 100.

Transformer 230 also has a winding 234 with end terminals 235 and 236. End terminal 236 of winding 234 is connected to a terminal 250 of a signal generator 244 and also to an input terminal 257 of demodulator 252. End terminal 235 of winding 234 is connected to a terminal 253 of signal generator 244 and to the input terminal 256 of demodulator 252. Winding 231 of transformer 230 connects the output terminal 232 of demodulator 227 to an input terminal 233 of a rate network 238. Rate network 238 has an output 239 connected directly to the input 112 of the in-phase modulator 110 by means of a conducting lead 113.

Figure 5:
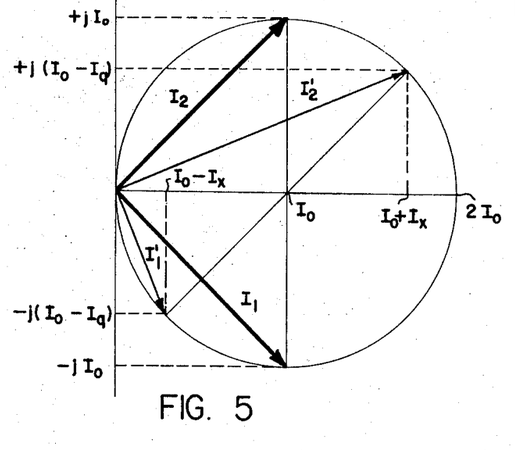
FIGURE 5 is a graphical representation of the current phase relationship of suspension servo current vectors of FIGURE 4.

FIGURE 5 depicts the phase relationship of the currents at the two electrodes of a suspension channel of the type shown in FIGURE 4. The two currents in each channel are always in 90° phase relationship and their vector sum is always equal to a constant. Hence, by Pythagorean theorem the sum of the squares of the currents is also always constant. Vectors $I_1$ and $I_2$ indicate a situation when the rotor is under zero acceleration and the two currents are equal while vectors $I_1'$ and $I_2'$ picture a situation when a component of acceleration force acts on the rotor in the direction from the electrode carrying current $I_2$ toward the electrode carrying current $I_1$. The acceleration force is tending to move the rotor away from the electrode carrying $I_2$ and an increase in $I_2$ and a corresponding decrease in $I_1$ offset this force and maintain the inertial mass in constant relationship with the electrode structure.

Figure 6:
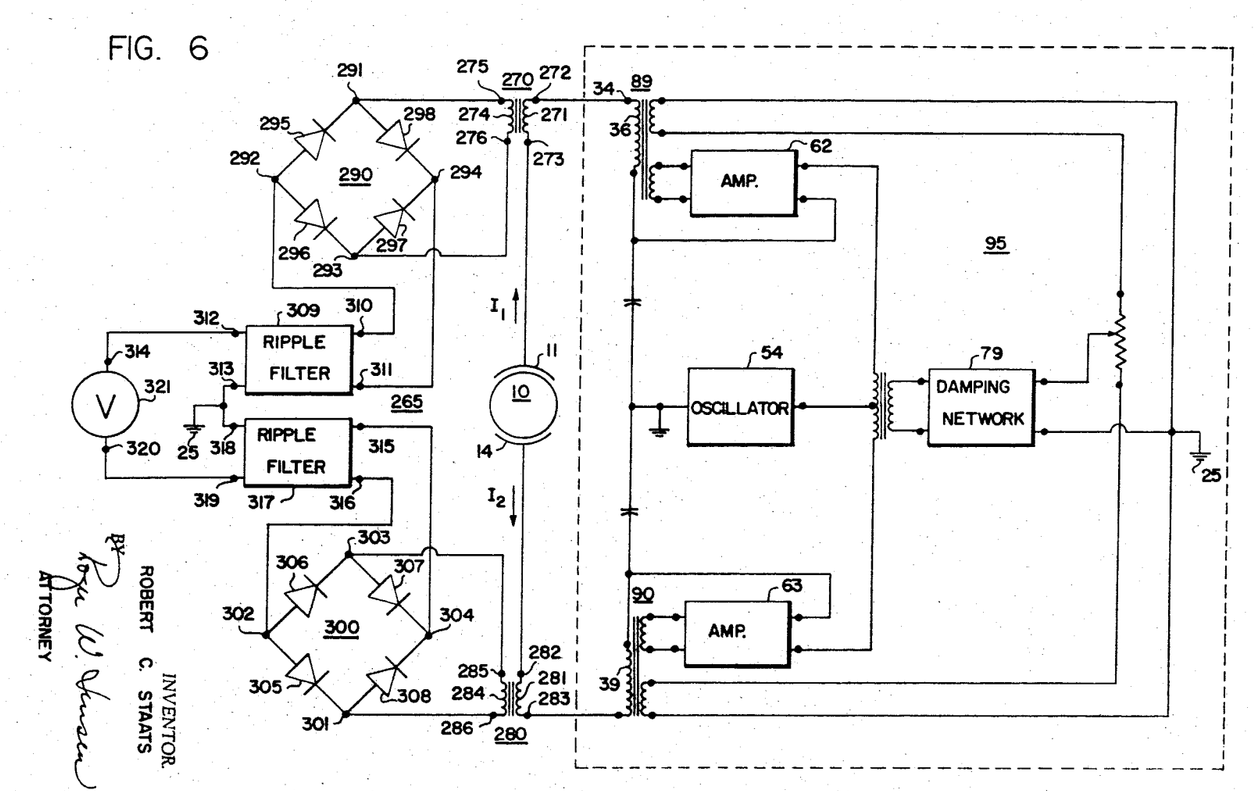
FIGURE 6 is a schematic diagram showing how acceleration proportional signals can be obtained from the suspension systems of FIGURES 3 and 4.

In FIGURE 6 electrodes 11 and 14 supporting an inertial member 10 are energized by a suspension channel 95 described with reference to FIGURE 3. All the reference numbers used in FIGURE 6 are identical to those used in FIGURE 3 for the corresponding parts. An acceleration sensing circuit 265 is connected to suspension channel 95 by means of current transformers 270 and 280 to sample the currents at the two electrodes.

A primary winding 271 of transformer 270 is connected between electrode 11 and end terminal 34 of the secondary winding 36 of transformer 89. Transformer 270 further has a secondary winding 274 with end terminals 275 and 276. End terminal 275 of winding 274 is connected to a terminal 291 of a full wave rectifier diode bridge 290. Diode bridge 290 further has terminals 292, 293, and 294. Diode 295 is connected between terminals 291 and 292 of bridge diode 290 and diode 298 is connected in series with diode 295 between terminals 291 and 294. Diodes 295 and 298 are oriented for forward current flow from terminal 292 to terminal 294 of bridge 290. A diode 296 is connected between terminals 292 and 293 and a diode 297 is connected in series with diode 296 between terminals 293 and 294. Diodes 296 and 297 are also connected for forward current flow from terminal 292 to terminal 294. Terminal 293 of diode bridge 290 is connected to end terminal 276 of secondary winding 274 of transformer 270. Terminal 292 is connected directly to an input terminal 310 of a ripple filter 309. Ripple filter 309 also has an input terminal 311 and output terminals 312 and 313. The input terminal 311 is connected to terminal 294 of bridge rectifier 290. Output terminal 313 is connected directly to ground 25 and output terminal 312 is connected to a terminal 314 of voltage sensing meter 321. The voltage sensing meter 321 also has a terminal 320.

A primary winding 281 of a transformer 280 is connected between electrode 14 and end terminal 38 of secondary winding 39 of transformer 90. Transformer 280 also has a secondary winding 284 with end terminals 285 and 286. End terminal 286 of winding 284 is connected to a terminal 308 of a full-wave rectifier diode bridge 300. Diode bridge 300 also has terminals 302, 303, and 304. Terminal 303 of diode bridge 300 is connected to end terminal 285 of winding 284. Diode 305 is connected between terminals 302 and 301 of diode bridge 300 and diode 308 is connected in series with diode 305 between terminals 301 and 304. Diodes 305 and 308 are oriented for forward current flow from terminal 302 to terminal 304. Diode 306 is connected between terminals 302 and 303 and diode 307 is connected in series with diode 306 between terminals 303 and 304. Diodes 306 and 307 are also oriented for forward current flow from terminal 302 to terminal 304 of diode bridge 300. Terminal 302 of bridge 300 is connected to an input terminal 316 of a ripple filter 317. Ripple filter 317 further has an input terminal 315 and output terminals 318 and 319. Input terminal 315 is connected to terminal 304 of diode bridge 300 and output terminal 318 is connected to ground 25. Output terminal 319 is connected to terminal 320 of voltage sensing meter 321.

The electrode structure illustrated in FIGURE 7 is comprised of six electrically isolated electrodes arranged in an expanded cube type of formation outlining a spherical cavity 23 with a diameter somewhat larger than the diameter of a spherical inertial member 10 positioned inside the cavity 23. The six electrodes have equal areas and are geometrically congruent to each other. The four sides or edges of each electrode are of equal length and each edge is a segment of a great circle on the spherical surface of the cavity 23. Each of the three pairs of diametrically opposed electrodes is centered on one of the three orthogonal axes $x$, $y$, or $z$. The reference numerals here correspond to those of FIGURE 1 so that the electrode structure of FIGURE 1 could be substituted by the electrode structure shown in FIGURE 7. This arrangement ideally fulfills the requirement of a three phase suspension design, because it displays perfect symmetry about each of the three suspension axes and utilizes the maximum area available for electrostatic support forces.

OPERATION

The suspension of the inertial member in an inertial instrument such as described here is accomplished by means of controlled electrostatic field forces generated between the inertial member or rotor and an array of electrodes surrounding the inertial member. In a preferred embodiment of this invention shown in FIGURE 1, the currents are controlled at each electrode by a current generator and since an electrostatic field is directly proportional to the current, the field's strength is thus controlled. The two generators of each electrode pair, as for example at electrodes 11 and 14, work together, so that as the inertial member moves away from one electrode the current of that electrode increases, while the current at the other electrode of that pair decreases by an appropriate amount. The sum of the two currents at the two electrodes of each pair is always kept constant. The magnitudes of the three sums of currents of the three electrode pairs are at the same time maintained equal to each other and in 120° phase relationship with each other. The suspension described then is, as mentioned before, a three phase system allowing the inertial member to remain at virtual ground potential. This is a necessary condition since to maintain suspension the inertial member must be at virtual ground while no direct connection between the member and the ground is possible. Because this condition is set each electrode pair and the associated electronics, referred to as a suspension channel, may be treated separately. FIGURES 2, 3, 4, and 6 all refer to a single channel of suspension and the description of one channel adequately describes any system of suspension utilizing a number of such channels. It should be pointed out that it is not required that the system be of the three phase type described here and that for example four channels with currents in a 90° phase relationship or five channels with currents in 72° phase relationship could be employed just as well. Neither is it a necessary condition that the currents be equally spaced on a phase plane or that the magnitude of the sums of currents at all electrode pairs be equal. It is only necessary that the phase relationships and the current magnitudes be mutually so regulated that the net current through the inertial member is zero and no charge accumulates on the inertial member.

Nor is the invention limited to use with any particular type of electrode configuration although the electrode structure illustrated in FIGURE 7 is a preferred embodiment for a three phase suspension supporting spherical inertial member. The advantages of this configuration are that it utilizes the maximum area available for electrostatic support forces and it at the same time displays perfect symmetry about each of the three suspension axes. This symmetry will greatly reduce errors due to rotor radial mass unbalance. The design of the electrodes will of course be dictated by the type of the suspension desired and by the geometry of the inertial member which may or may not be a sphere. It should be added that the invention described here can be used in both the gimballed and the strapped-down modes of inertial instruments.

In FIGURE 3 the excitation frequency of the oscillator 94 is much greater than the natural frequency of the support servo. Oscillator 94 provides a signal at the output 73 and feeds it to primary winding 75 of transformer 69 into amplifiers 62 and 63. Amplifiers 62 and 63 are identical and can be any of the standard amplifiers well known to those skilled in the art.

In amplifier 62 the signal is amplified and impressed on the primary winding 48 of transformer 89 between terminals 50 and 51. The primary winding 48 energizes the secondary winding 36 between terminals 34 and 35. Terminal 35 is connected to ground 25 through capacitor 47 while electrode 11 is energized from secondary winding 36 by conductor 91. An electrostatic field is thus established between electrode 11 and spherical inertial member 10 which is at virtual ground. In the same way the signal is amplified in amplifier 63 and impressed on the primary winding 40 of transformer 90 between terminals 42 and 43. The primary winding 40 energizes the second winding 39 between terminals 37 and 38. Terminal 37 is grounded through capacitor 46 and electrode 14 is energized from terminals 38 of secondary winding 39 through conductor 92. An electric field is established between electrode 14 and sphere 10.

Since the amplifiers are providing substantially constant current outputs any change in the sphere position will reflect in a change in voltage between the sphere and the electrodes. Voltage is related to the current by:

$$V = \frac{I}{j\omega_c C} \quad (1)$$

where $V$ is the electrode to rotor voltage, $I$ is the current at the electrode, $\omega_c$ is the frequency of the oscillator and $C$ is the electrode to sphere capacitance. In this invention the current and the oscillator frequency are kept substantially constant, but the capacitance, as is well known in the art, varies with the distance between the charge carrying surfaces and therefore changes with the variations in the electrode to sphere gap. The instantaneous electrode to sphere capacitance is described by $$C = \frac{C_0}{1 - \frac{x}{h}} \quad (2)$$

where $C_0$ is the capacitance of the electrode-sphere combination when the sphere is centered on the position of zero acceleration forces, $h$ is the width of the electrode-sphere gap when no acceleration forces are present and $x$ is the displacement of the sphere due to external forces.

Signals proportional to the voltage between the sphere 10 and electrode 11 are sensed by the secondary winding 49 of transformer 89 and signals proportional to the voltage between sphere 10 and electrode 14 are sensed by secondary winding 41 of transformer 90. If the two voltages are equal, no signal appears across potentiometer 85, but if the two voltages differ indicating that the sphere is displaced from the neutral position a signal appears across potentiometer 85 and is fed into the damping network 79 at the input terminal 80. The function of the damping network 79 is to arrest any undesirable oscillations of the sphere. A signal proportional to the displacement of the sphere appears between the output terminals 77 and 78 of the damping network 79 across the secondary winding 76 of transformer 69 and is induced in the primary winding 75 of transformer 69. It can be seen that the oscillator signals fed through primary winding 75 to amplifiers 62 and 63 have a common polarity at terminal 72 and terminals 70 and 71, therefore, always possesses the same instantaneous polarity, that is, they are either both at a negative or at a positive potential with respect to center tap 72. On the other hand the signal induced in winding 75 by the secondary winding 76 appears between terminals 70 and 71 so that the two terminals are of opposing polarity and the center tap is instantaneously positive with one and negative with the other. The induced signal proportional to the sphere displacement, therefore, adds to the oscillator signal fed into one of the amplifiers and substracts from the oscillator signal fed into the other amplifier of suspension channel 95. Winding 76 of transformer 69 is oriented so that the signal is increased on the side of the increasing sphere to electrode gap and descreased on the side of decreasing gap. It follows that the attractive electro-static suspension force increases on the side from which the sphere has moved and decreases on the side toward which is approached. A great advantage of this invention is that the currents are not dependent upon the gap variation but only upon the position of the geometric center of sphere 10.

The inertial member of an electrostatic inertial instrument and more specifically a gyroscope, is supported by an electric field developed between a set of electrodes and inertial member or rotor. Since the rotor is a conductor, all lines of forces are normal to the surface. No torques are produced if the rotor is a perfect sphere, since all lines of force then pass through the center of the sphere. In actual practice this condition can only be approximated. If an electrode structure of the type shown in FIGURE 7 where the electrostatic forces are produced along three orthogonal axes is used and the spin axis of the rotor is perfectly aligned with one of the force axes, no torques will be produced even if the rotor is not a perfect sphere. However, it is difficult to maintain the spin axis aligned and it has been found that the torque produced by this effect can be compensated internally by controlling the sums of the squares of the voltage gradients on each axis to be equal to each other. By imposing the condition that:

$$\left(\frac{V_1^2}{h_1^2}+\frac{V_2^2}{h_2^2}\right)=\left(\frac{V_3^2}{h_3^2}+\frac{V_4^2}{h_4^2}\right)=\left(\frac{V_5^2}{h_5^2}+\frac{V_6^2}{h_6^2}\right) \quad (3)$$

where $V_1$, $V_2$, $V_3$, $V_4$, $V_5$, and $V_6$ are the electrode to rotor voltages at electrodes 11, 14, 13, 16, 12, and 15 of FIGURE 1 respectively and $h_1$, $h_2$, $h_3$, $h_4$, $h_5$, and $h_6$ are respective electrode to rotor gaps, the electric torque due to spin axis misalignment is nulled.

If
$$h_1 = h - x \quad (4)$$
and
$$h_2 = h + x \quad (5)$$

where $h$ is the means rotor gap and $x$ is the change in the gap width due to rotor displacement as explained with reference to FIGURE 2. Then:

$$V_1 = \frac{I_1}{j\omega_c C_0}\left(1-\frac{x}{h}\right) \quad (6)$$

$$V_2 = \frac{I_2}{j\omega_c C_0}\left(1+\frac{x}{h}\right) \quad (7)$$

and the rotor to electrode gradients are:

$$\epsilon_1 = \frac{V_1}{h-x} = \frac{I_1}{j\omega_c C_0 h} \quad (8)$$

$$\epsilon_2 = \frac{V_2}{h+x} = \frac{I_2}{j\omega_c C_0 h} \quad (9)$$

so that $$\frac{V_1^2}{h_1^2}+\frac{V_2^2}{h_2^2}=\epsilon_1^2+\epsilon_2^2=\frac{I_1^2+I_2^2}{\omega_c^2 C_0^2 h^2} \quad (10)$$

Equations 8 and 9 show that the gradients are directly proportional to the currents and the control of currents effectively constitutes gradient control.

How the currents can be controlled without generating square functions will be explained with reference to FIGURES 4 and 5. In FIGURE 5 $I_1$ and $I_2$ are shown by heavy black vectors. In order to keep vector sum of $I_1$ and $I_2$ constant, and equal to $2I_0$, the tips of the current vectors must always lie on a circle of radius $I_0$. Therefore, $I_1$ and $I_2$ are always inscribed in a semicircle, and the angle between them must always be 90°. By the Pythagorean theorem, the sum of the squares of $I_1$ and $I_2$ must always be a constant and equal to $4I_0^2$.

Under zero acceleration, the current vectors will be as shown by $I_1$ and $I_2$. It will be noted from FIGURE 5 that for this condition each of the currents $I_1$ and $I_2$ has an in-phase component of magnitude $I_0$ and the quadrature components of the currents $I_1$ and $I_2$ are $-jI_0$ and $+jI_0$ respectively. In the presence of a typical acceleration, the vectors change to $I_1'$ and $I_2'$. The amount of change from $I_1$ and $I_2$ depends upon the magnitude of the acceleration, however, the two current vectors always remain normal to each other and the tips of the current vectors if drawn from the origin, as shown in FIGURE 5, will always be on a circle of radius $I_0$.

For the assumed acceleration condition depicted in FIGURE 5, it will be noted that the in-phase components of the currents $I_1'$ and $I_2'$ respectively are equal to $(I_0-I_x)$ and $(I_0+I_x)$, the current $I_x$ being an in-phase variable which is a function of the magnitude of the acceleration. Further, the quadrature components of the currents $I_1'$ and $I_2'$ respectively are equal to $-j(I_0-I_q)$ and $+j(I_0-I_q)$ where $I_q$ is a quadrature variable which is a functure of the magnitude of the acceleration. Since the two current vectors $I_1'$ and $I_2'$ for any amount of acceleration force action on the rotor will be substantially in 90° phase relationship. It can be seen that the magnitude of the vector sum of the two current vectors will be substantially the same as the magnitude of the vector difference. Conversely, by forcing this equality of magnitudes of vector sum and vector difference, it can be assured that the two current vectors will be in 90° phase relationship. The desired relationship then is:

$$I_2 - I_1 = I_1 + I_2 \quad (11)$$

This conclusion can also be verified mathematically. How this can be physically accomplished is shown in FIGURE 4 which is one possible mechanization of a suspension channel.

Signals at the inputs 136 of amplifier 135 and 156 of amplifier 155 are combinations of signals from oscillator 100, the in-phase modulator 110 and amplifier 214 which receives its input signal from quadrature modulator 208. Oscillator 100 is of the same type as oscillator 94 of FIGURE 3 and can be any one of the standard oscillators well known to those skilled in the art. The frequency of the oscillator should be substantially higher than the natural frequency of the support servo. A frequency in the neighborhood of 50 kc. has been found satisfactory. The signal from oscillator 100 is fed to amplifier 135 through secondary winding 127 of transformer 103 between center tap 104 and end terminal 105, and through secondary winding 116 of transformer 115 connected to input terminal 136 of amplifier 135 by conductor 125. In the same way the signal from oscillator 100 is fed to amplifier 155 at the input terminal 156 through winding 127 of transformer 103 between center tap 104 and end terminal 106 and through secondary winding 120 of transformer 115 which is connected to input terminal 156 of amplifier 155 by conductor 126.

In transformer 103 a signal from the output of the in-phase modulator 110 appearing across the primary winding 107 is induced in the secondary winding 127 and is superimposed on the oscillator signal passing through winding 127. It can be seen that the signal from the oscillator 100 is fed into the primary winding 127 at the center tap 104 and that at any instant of time the polarities of terminals 105 and 106 are the same. On the other hand the induced signal from the primary winding 107 is of opposite polarities at terminals 105 and 106 and will therefore add to the oscillator signal between center tap 104 and one end terminal and subtract from the oscillator signal appearing between the center tap 104 and the other end terminal. By the same reasoning the induced signal from the output of amplifier 214 across winding 122 induced in windings 116 and 120 of transformer 115 will add to the signal in one winding and subtract from the signal in the other winding. It should be noted that the signal from the in-phase modulator 110 induced in winding 127 of transformer 103 is in-phase with the signal from the oscillator 100 and the signal induced by the primary winding 122 from amplifier 214 is in quadrature with oscillator frequency. Consequently the input signals into amplifiers 135 and 155 will be of different phase. The phase relationship between the signals at the input of amplifiers 135 and 155 ideally should be 90°.

The input signal to amplifier 135 is amplified and appears between output terminals 138 and 139 across the primary winding 140 of transformer 141. The signal from the primary winding 140 is induced in the secondary winding 145 and fed through primary winding 170 of transformer 169 to energize electrode 11 facing rotor 10. In the same way the input signal fed into amplifier 155 at the input terminal 156 is amplified and appears between the output terminals 158 and 159 across primary winding 160 of transformer 161. The signal from primary winding 160 is induced in the secondary winding 165 and is fed through primary winding 180 of transformer 179 to energize electrode 14 facing rotor 10. Rotor 10 is suspended between electrodes 11 and 14 by electric forces produced by potentials between electrodes and rotor 10 which is at virtual ground. The feedback from the end terminal 147 of winding 145 of transformer 141 to the input terminal 137 of amplifier 135 and from the end terminal 167 of winding 165 of transformer 161 to the input terminal 157 of amplifier 155 assures that amplifiers 135 and 155 will provide substantially constant current outputs independent of the electrode to rotor capacitance.

Currents at electrodes 11 and 14 are sampled with small current transformers 169 and 179 shown in FIGURE 4. Secondary winding 176 of transformer 169 and secondary winding 183 of transformer 179 are connected to diode bridge rectifier 199 in such a way that the currents are rectified, added and filtered and the output of bridge rectifier 199 at terminal 193 is a DC signal indicative of the magnitude of the vector sum of currents at the two electrodes. The output signal of bridge 199 is fed into quadrature modulator 208 at the input terminal 209.

Secondary winding 173 of transformer 169 and secondary winding 186 of transformer 179 are connected to full wave rectifier diode bridge 200 in such a way that one current subtracts from the other and that the filtered output of bridge 215 at terminal 206 is a DC signal indicative of the magnitude of the vector difference of the currents at the two electrodes. This is accomplished by reversing the direction of one of the windings. The signal from terminal 206 of bridge 215 is then fed into quadrature modulator 208. The reference frequency for the quadrature modulator 208 is obtained from oscillator 100 at output 128 of oscillator 100 and fed through a 90° phase shift network 218 to input terminal 210 of quadrature modulator 208. The output of quadrature modulator 208 is fed into amplifier 214 where it is amplified and the amplified signal appears at the output of amplifier 124 across the primary winding 122 of transformer 115. The input signal to quadrature modulator 208 appears between input terminals 206 and 209 and is equal to the difference of the output current levels of bridge rectifiers 199 and 215.

As mentioned with reference to FIGURE 3 any change in rotor position with respect to the electrodes will reflect a change in voltage between the rotor and the electrodes since the currents remain substantially constant. In FIGURE 4 signals proportional to the voltage between rotor 10 and electrode 11 are sensed by the secondary winding 142 of transformer 141 and a signal proportional to the voltage between rotor 10 and electrode 14 is sensed by a secondary winding 162 of transformer 161. The sum of the two voltages at the two electrodes will then appear between terminals 221 and 223 of the series combination of resistors 220 and 224 and the difference of the two voltages will appear at terminal 222 between resistors 220 and 224. The signal proportional to the difference of the two voltages between rotor 10 and electrodes 11 and 14 is fed from terminal 222 into demodulator 227 at input 229. The reference frequency of demodulator 227 is obtained from output 128 of oscillator 100 and fed into demodulator 227 at input 261. The output of demodulator 227 is fed to a rate network 238 through a primary winding 231 of a transformer 230. The output signal of rate network 238 is fed from its output 239 into the input 112 of in-phase modulator 110 by means of conductor 113. The function of demodulator 227 is to remove the carrier frequency and the output signal of the demodulator. At terminal 232 is a DC signal proportional to the difference of the potentials at electrodes 11 and 14. The rate network 238 is inserted to stabilize the circuit and eliminate free undamped oscillations. At the output of the in-phase modulator 110 then is a signal proportional to the force acting on the rotor. The signal is in phase with the signal from oscillator 100 and is added to the signal from the oscillator in the manner described before to regulate the outputs of amplifiers 135 and 155. The signal is added in such a way that the signal into the amplifier at the electrode with the increasing rotor gap becomes larger and the signal into the amplifier at the electrode with the decreasing rotor gap becomes smaller.

If additional accuracy is required an optimizing position servo can be incorporated into the basic suspension system described to minimize the gyro systematic drift of the spin axis due to rotor sag. To minimize this drift it is necessary that the steady state rotor sag be zero as referenced to the position of zero acceleration force. One method of accomplishing this is by including an automatic sag control network 264 in the suspension electronics. A small dither voltage signal is injected into the suspension loop at transformer 230 as shown in FIGURE 4. The dither voltage, generated by signal generator 244 between output terminals 250 and 253 is impressed upon the primary winding 234 of transformer 230. The primary winding 234 induces a signal into secondary winding 231 which is in series with the output of demodulator 227 and input of rate network 238. The dither voltage is varying with time at a frequency which is slow enough for the inertial mass 10 to follow. If the dither voltage is of the form:

$$E = E_m \sin \omega_1 t$$

then the rotor sag will be expressed by:

$$X = X_0 + X_m \sin(\omega_1 t + \phi)$$

where $\omega_1$ is the frequency of the dither voltage, $X_0$ is the steady-state rotor sag and $X_m$ is the peak rotor displacement due to dither voltage. The signal proportional to the sum of the voltages at the two electrodes appearing between terminals 221 and 223 of the series combination of resistors 220 and 224 is applied at the input of demodulator 245 between input terminals 246 and 247. This signal contains the basic carrier frequency and its various harmonics and also the frequency of the dither voltage and its harmonics.

The demodulator 245 eliminates the carrier frequency from the signal and the output of the demodulator is passed through a band pass filter 249. The function of the band pass filter 249 is to eliminate all the harmonics and distortion and allow only the signal with the fundamental frequency of dither voltage to be fed into the demodulator 252. It can be shown mathematically that the signal at the output of band pass filter 249 is a periodic signal whose amplitude is proportional to the steady-state rotor sag. The signal appearing at the output of the demodulator 252 is a DC signal proportional to rotor sag. The output signal from demodulator 252 is fed into an integrator 255 whose output signal then is proportional to the force required to maintain rotor in steady state zero sag position. When the sag of the rotor 10 is zero the output of demodulator 52 and the input signal to integrator 255 at terminal 256 will be zero. If however, the rotor sags an input signal into integrator 255 will be present until the output of the integrator 257 becomes sufficiently large that it will, through in-phase modulator 210 and through amplifiers 135 and 155, provide sufficient compensating potentials on the electrodes 11 and 14 to restore the rotor to the no sag position at the center of the electrode structure. If the rotor sags in an opposite direction due to a change in force direction a signal of opposite sign will appear at the input of integrator 255 until the output of the integrator 255 is again such that proper compensation will be effected. The output signal of the rate network 238 and the integrator 255 are added in the in-phase modulator 110 and the output of the in-phase molulator 110 is proportional to their sum.

The currents at the electrodes are proportional to the acceleration forces and by measuring these currents information about the acceleration magnitude can be obtained. One possible embodiment of the acceleration measuring circuit is shown in FIGURE 6. Electrodes 11 and 14 facing the rotor 10 in FIGURE 6 are energized by the suspension channel 95 described with reference to FIGURE 3. The currents at each electrode are measured by inserting a current transformer in series with each electrode. A signal proportional to the current at electrode 11 appears across primary winding 271 of transformer 270 and is induced in the secondary winding 274 between terminals 275 and 276. The signal from secondary winding 274 is rectified by a full wave diode bridge rectifier 290 with the DC output of the bridge apearing between terminals 292 and 294 and being fed into a ripple filter 309 at the input terminals 310 and 311. A DC signal proportional to the current at the electrode 11 then appears at the output of the ripple filter 309 between terminal 312 and terminal 313 which is at ground potential. A signal proportional to the current at the electrode 14 appears across the primary winding 281 of transformer 280 and is induced in the secondary winding 284 between terminals 285 and 286. The signal therefore also appears between terminals 301 and 303 of the full wave diode bridge rectifier 300. The signal is passed through a ripple filter 317 and a DC signal proportional to the current at the electrode 14 appears between terminals 318 and 319 at the output of the ripple filter 317. Terminal 318 is at ground potential, while terminal 319 is at a potential indicative of the curernt magnitude at electrode 14. By measuring the difference of the signal levels at output terminal 319 of ripple filter 317 and output terminal 312 of ripple filter 309 a signal proportional to the acceleration can be measured. A voltage sensing means 321 is connected between terminals 312 and 319.

This type of an arrangement can be used anywhere where the electrode currents are substantially independent of the rotor gap. For increased accuracy a suspension channel of the type shown in FIGURE 4 could be used with an acceleration measuring circuit similar to the type illustrated in FIGURE 6 connected to the electrode energizing leads.

I claim as my invention:

1. In an inertial instrument:
   a housing having insulative means defining a generally hollow spherically shaped cavity;
   a plurality of pairs of electrically isolated electrodes mounted on said insulative means of said housing and adjacent to said cavity with the electrodes of each pair having substantially the same area of surface exposed to said cavity and being arranged so that the center of the area of one electrode of one of said pairs is substantially diametrically opposite the center of the area of the other electrode of said one of said pairs;
   an electrically conductive substantially spherically shaped nonmagnetic member positioned within said cavity;
   means connected to said electrodes for establishing electric fields between said electrodes and said member so that said member is levitated free of physical contact of said electrodes, said field establishing means including means for controlling the electric fields between said member and both electrodes of each of said electrode pairs so that the sum of the square of the magnitudes of said fields for each of said pairs is substantially constant and also substantially equal to the sum of the squares of the fields of each of the other of said pairs;
   an automatic rotor sag control network connected to said electrodes for providing compensating forces on the rotor to eliminate rotor sag; and
   means connected to said electrodes of each electrode pair for detecting the magnitudes of said currents at said electrodes and providing an output signal indicative of acceleration along the axis of each electrode pair.

2. An inertial instrument:
   a housing having insulative means defining a generally hollow spherically shaped cavity;
   a plurality of pairs of electrically isolated electrodes mounted on said insulative means of said housing and adjacent to said cavity with the electrodes of each pair having substantially the same area of surface exposed to said cavity and being arranged so that the center of the area of one electrode of one of said pairs is substantially diametrically opposite the center of the area of the other electrode of said one of said pairs;
   an electrically conductive substantially spherically shaped nonmagnetic member positioned within said cavity;
   means connected to said electrodes for establishing electric fields between said electrodes and said member so that said member is levitated free of physical contact of said electrodes, said field establishing means including means for controlling the electric fields between said member and both electrodes of each of said electrode pairs so that the sum of the squares of the magnitudes of said fields for each of said pairs is substantially constant and also substantially equal to the sum of the squares of the fields of each of the other of said pairs; and
   an automatic rotor sag control network connected to said electrodes for providing compensating forces on the rotor to eliminate rotor sag.

3. In an inertial instrument:
   a housing having insulative means defining a generally hollow spherically shaped cavity;

a plurality of pairs of electrically isolated electrodes mounted on said insulative means of said housing and adjacent to said cavity with the electrodes of each pair having substantially the same area of surface exposed to said cavity and being arranged so that the center of the area of one electrode of one of said pairs is substantially diametrically opposite the center of the area of the other electrode of said one of said pairs;

an electrically conductive substantially spherically shaped nonmagnetic member positioned within said cavity;

means connected to said electrodes for establishing electric fields between said electrodes and said member so that said member is levitated free of physical contact of said electrodes, said field establishing means including means for controlling the electric fields between said member and both electrodes of each of said electrode pairs so that the sum of the squares of the magnitudes of said fields for each of said pairs is substantially constant and also substantially equal to the sum of the squares of the fields of each of the other of said pairs; and means connected to said electrodes of each electrode pair for detecting the magnitudes of said currents at said electrodes and providing an output signal indicative of acceleration along the axis of each electrode pair.

4. In an inertial instrument:

a housing having insulative means defining a generally hollow spherically shaped cavity;

a plurality of pairs of electrically isolated electrodes mounted on said insulative means of said housing and adjacent to said cavity with the electrodes of each pair having substantially the same area of surface exposed to said cavity and being arranged so that the center of the area of one electrode of one of said pairs is substantially diametrically opposite the center of the area of the other electrode of said one of said pairs;

an electrically conductive substantially spherically shaped nonmagnetic member positioned with said cavity; and means connected to said electrodes for establishing electric fields between said electrodes and said member so that said member is levitated free of physical contact of said electrodes, said field establishing means including means for controlling the electric fields between said member and bath electrodes of each of said electrode pairs so that the sum of the squares of the magnitudes of said fields for each of said pairs is substantially constant and also substantially equal to the sum of the squares of the fields of each of the other of said pairs.

5. In a inertial instrument:

a housing having insulative means defining a generally hollow spherically shaped cavity;

a plurality of pairs of electrically isolated electrodes mounted on said insulative means of said housing and adjacent to said cavity with the electrodes of each pair having substantially the same area of surface exposed to said cavity and being arranged so that the center of the area of one electrode of one of said pairs is substantially diametrically opposite the center of the area of the other electrode of said one of said pairs;

an electrically conductive substantially spherically shaped nonmagnetic member positioned within said cavity;

means connected to said electrodes for establishing electric fields between said electrodes and said member so that said member is levitated free of physical contact of said electrodes, said field establishing means including means for controlling the electric fields between said member and both electrodes of each of said electrode pairs so that the sum of the squares of the magnitudes of said fields for each of said pairs is substantially constant and also substantially equal to the sum of the squares of the fields of each of the other of said pairs; and an automatic rotor sag control network means connected to each pair of said electrodes, said network means comprising, a signal generating means for providing a dither voltage signal, said dither voltage varying with time at a sufficiently low frequency to allow said inertial member to oscillate at said dither voltage frequency, superimposing on said electrode to rotor potentials a component of voltage varying at said frequency of said dither signal, means connected to said electrodes for measuring at the two electrodes of said pair the sum of said voltage components varying at said dither frequency, the magnitude of said sum of said voltages being proportional to said rotor sag, means connecting said voltage measuring means to said field establishing means to vary said electric fields between said member and said electrodes in proportion to the magnitude of said rotor sag, decreasing the strength of said field at the electrode toward which said rotor sags and increasing the strength of said field at the electrode from which said rotor is removed due to said sag.

6. In an inertial instrument:

a housing having insulative means defining a hollow cavity;

a plurality of pairs of electrically isolated electrodes mounted on said insulative means of said housing and adjacent to said cavity with the electrodes of each pair arranged so that one electrode of one of said pairs is substantially opposite the other electrode of said pair;

an electrically conductive nonmagnetic member positioned within said cavity;

and means connected to said electrodes for establishing electric fields between said electrodes and said member so that said member is levitated free of physical contact of said electrodes, said field establishing means including means for controlling the electric fields between said member and both electrodes of each of said electrode pairs so that the sum of the squares of the magnitudes of said fields for each of said pairs is substantially constant.

7. In an inertial instrument:

a housing having insulative means defining a generally hollow spherically shaped cavity;

three pairs of electrically isolated electrodes each pair centered on one of three orthogonal axes intersecting at the center of said cavity and mounted on said insulative means of said housing adjacent to said cavity with the electrodes of each pair having substantially the same area of surface exposed to said cavity and being substantially diametrically opposite to each other;

an electrically conductive substantially spherically shaped nonmagnetic member positioned within said cavity; and means connected to said electrodes for establishing electric fields between said electrodes and said member so that said member is levitated free of physical contact of said electrodes, said field establishing means including means for controlling the electric fields between said member and both electrodes of each of said electrode pairs so that the sum of the squares of the magnitudes of said fields for each of said pairs is substantially constant and also substantially equal to the sums of the squares of the fields of the other of said pairs.

8. In an inertial instrument:

a housing having insulative means defining a generally hollow spherically shaped cavity;

three pairs of electrically isolated electrodes mounted on said insulative means of said housing and adjacent to said cavity with said electrodes each having substantially the same area of surface exposed to said cavity each electrode having four equal sides and four equal angles, the edges of said electrodes being segments of great circles on the spherical surface of said cavity;

an electrically conductive substantially spherically shaped nonmagnetic member positioned within said cavity; and means connected to said electrodes for establishing electric fields between said electrodes and said member so that said member is levitated free of physical contact of said electrodes, said field establishing means including means for controlling the electric fields between said member and both electrodes of each of said electrode pairs so that the sum of the squares of the magnitudes of said fields for each of said pairs is substantially constant and also substantially equal to the sum of the squares of the fields of each of the other of said pairs.

9. In an inertial instrument:

a housing having insulative means defining a generally hollow spherically shaped cavity;

three pairs of electrically isolated electrodes mounted on said insulative means of said housing and adjacent to said cavity, with the electrodes of each pair having substantially the same area of surface exposed to said cavity and being arranged so that the center of the area of one electrode of each of said pairs is substantially diametrically opposite the center of the area of the other electrode of said pair;

an electrically conductive substantially spherically shaped nonmagnetic inertial member positioned within said cavity;

means connected to said electrodes for establishing electric fields between said electrodes and said member so that said member is levitated free of physical contact of said electrodes, said field establishing means including an alternating constant current generating means of the same frequency connected to each of said electrodes to control the current at each of said electrodes so that the currents at the two electrodes of each pair are in a 90° phase relationship and so that if said rotor moves relative to said housing due to an external acceleration being applied to said instrument, the relative movement being the displacement of said rotor from the center of said electrode cavity toward one electrode of one of said electrode pairs, the current at said one of said electrodes decreases in magnitude by an amount proportional to said external force applied to said instrument and the current at the other electrode of said pair increases by an amount so that the vector sum of said two currents at said electrode pair is of a substantially constant magnitude and the vector sums of the currents in each of the three electrode pairs are of equal magnitude and are separated from each other in phase by 120°;

an automatic rotor sag control network connected to said electrodes providing compensating forces on the rotor to eleminate rotor sag; and readout means connected to said electrodes of each electrode pair for detecting the magnitudes of said currents at said electrodes and providing an output signal indicative of acceleration along the axis of each electrode pair.

10. In an inertial instrument:

a housing having insulative means defining a generally hollow spherically shaped cavity;

three pairs of electrically isolated electrodes mounted on said insulative means of said housing and adjacent to said cavity, with the electrodes of each pair having substantially the same area of surface exposed to said cavity and being arranged so that the center of the area of one electrode of each of said pairs is substantially diametrically opposite the center of the area of the other electrode of said pair;

an electrically conductive substantially spherically shaped nonmagnetic inertial member positioned within said cavity;

means connected to said electrodes for establishing electric fields between said electrodes and said member so that said member is levitated free of physical contact of said electrodes, said field establishing means including an alternating constant current generating means of the same frequency connected to each of said electrodes to control the current at each of said electrodes so that the currents at the two electrodes of each pair are in a 90° phase relationship and so that if said rotor moves relative to said housing due to an external acceleration being applied to said instrument, the relative movement being the displacement of said rotor from the center of said electrode cavity toward one electrode of one of said electrode pairs, the current at said one of said electrodes decreases in magnitude by an amount proportional to said external force applied to said instrument and the current at the other electrode of said pair increases by an amount so that the vector sum of said two currents at said electrode pair is of a substantially constant magnitude and the vector sums of the currents in each of the three electrode pairs are of equal magnitude and are separated from each other in phase by 120°; and readout means connected to said electrodes of each electrode pair for detecting the magnitudes of said currents at said electrodes and providing an output signal indicative of acceleration along the axis of each electrode pair.

11. In an inertial instrument:

a housing having insulative means defining a generally hollow spherically shaped cavity;

three pairs of electrically isolated electrodes mounted on said insulative means of said housing and adjacent to said cavity, with the electrodes of each pair having substantially the same area of surface exposed to said cavity and being arranged so that the center of the area of one electrode of each of said pairs is substantially diametrically opposite the center of the area of the other electrode of said pair;

an electrically conductive substantially spherically shaped nonmagnetic inertial member positioned within said cavity;

means connected to said electrodes for establishing electric fields between said electrodes and said member so that said member is levitated free of physical conact of said electrodes, said field establishing means including an alternating constant current generating means of the same frequency connected to each of said electrodes to control the current at each of said electrodes so that the currents at the two electrodes of each pair are in a 90° phase relationship and so that if said rotor moves relative to said housing due to an external acceleration being applied to said instrument, the relative movement being the displacement of said rotor from the center of said electrode cavity toward one electrode of one of said electrode pairs, the current at said one of said electrode decreases in magnitude by an amount proportional to said external force applied to said instrument and the current at the other electrode of said pair increases by an amount so that the vector sum of said two currents at said electrode pair is of a substantially constant magnitude and the vector sums of the currents in each of the three electrode pairs are of equal magnitude and are separated from each other in phase by 120°; and an automatic rotor sag control network connected to said electrodes providing compensating forces on the rotor to eliminate rotor sag.

12. In an inertial instrument:
a housing having insulative means defining a generally hollow spherically shaped cavity;
three pairs of electrically isolated electrodes mounted on said insulative means of said housing and adjacent to said cavity, with the electrodes of each pair having substantially the same area of surface exposed to said cavity and being arranged so that the center of the area of one electrode of each of said pairs is substantially diametrically opposite the center of the area of the other electrode of said pair;
an electrically conductive substantially spherically shaped nonmagnetic inertial member positioned within said cavity; and
means connected to said electrodes for establishing electric fields between said electrodes and said member so that said member is levitated free of physical contact of said electrodes, said field establishing means including an alternating constant current generating means of the same frequency connected to each of said electrodes to control the current at each of said electrodes so that the currents at the two electrodes of each pair are in a 90° phase relationship and so that if said rotor moves relative to said housing due to an external acceleration being applied to said instrument, the relative movement being the displacement of said rotor from the center of said electrode cavity toward one electrode of one of said electrode pairs, the current at said one of said electrode decreases in magnitude by an amount proportional to said external force applied to said instrument and the current at the other electrode of said pair increases by an amount so that the vector sum of said two currents at said electrode pair is of a substantially constant magnitude and the vector sums of the currents in each of the three electrode pairs are of equal magnitude and are separated from each other in phase by 120°.

13. In an inertial instrument:
a housing having insulative means defining a generally hollow spherically shaped cavity;
three pairs of electrically isolated electrodes mounted on said insulative means of said housing and adjacent to said cavity, with the electrodes of each pair having substantially the same area of surface exposed to said cavity and being arranged so that the center of the area of one electrode of each of said pairs is substantially diametrically opposite the center of the area of the other electrode of said pair;
an electrically conductive substantially spherically shaped nonmagnetic inertial member positioned within said cavity;
means connected to said electrodes for establishing electric fields between said electrodes and said member so that said member is levitated free of physical contact of said electrodes, said field establishing means including an alternating constant current generating means of the same frequency connected to each of said electrodes to control the current at each of said electrodes so that the currents at the two electrodes of each pair are in a 90° phase relationship and so that if said rotor moves relative to said housing due to an external acceleration being applied to said instrument, the relative movement being the displacement of said rotor from the center of said electrode cavity toward one electrode of one of said electrode pairs, the current at said one of said electrode decreases in magnitude by an amount proportional to said external force applied to said instrument and the current at the other electrode of said pair increases by an amount so that the vector sum of said two currents at said electrode pair is of a substantially constant magnitude and the vector sums of the currents in each of the three electrode pairs are of equal magnitude and are separated from each other in phase by 120°;
and an automatic rotor sag control network means connected to each pair of said electrodes, said network means comprising, a signal generating means for providing a dither voltage signal to be added to the input signal to said current generating means, said dither voltage varying with time at a sufficiently low frequency to allow said inertial member to oscillate at said dither voltage frequency, superimposing on said electrode to rotor potentials a component of voltage varying at said frequency of said dither signal, means connected to said electrodes for measuring at the two electrodes of said pair the sum of said voltage components varying at said dither frequency, the magnitude of said sum of said voltages being proportional to said rotor sag, means connecting said voltage measuring means to said current generating means to vary the output of said current generating means in proportion to the magnitude of said rotor sag, decreasing the output of the current generator at the electrode toward which said rotor sags and increasing the output of the current generator at the electrode from which said rotor is removed due to said sag.

14. In an inertial instrument:
a housing having insulative means defining a generally hollow cavity;
three pairs of electrically isolated electrodes mounted on said insulative means of said housing and adjacent to said cavity, with the electrodes of each pair and being arranged so that one electrode of each of said pairs is substantially diametrically opposite the other electrodes of said pair;
an electrically conductive shaped nonmagnetic member positioned within said cavity; and
means connected to said electrodes for establishing electric fields between said electrodes and said member so that said member is levitated free of physical contact of said electrodes, said field establishing means including an alternating constant current generating means of the same frequency connected to each of said electrodes to control the current at each of said electrodes so that the currents at the two electrodes of each pair are in a 90° phase relationship and so that if said rotor moves relative to said housing due to an external acceleration being applied to said instrument, the relative movement being the displacement of said rotor from the center of said electrode cavity toward one electrode of one of said electrode pairs, the current at said one of said electrodes decreases in magnitude by an amount proportional to said external force applied to said instrument and the current at the other electrode of said pair increases by an amount so that the vector sum of said two currents at said electrode pair is of a substantially constant magnitude and the vector sums of the currents in each of the three electrode pairs are of equal magnitude and are separated from each other in phase by 120°.

15. In an inertial instrument:
a housing having insulative means defining a generally hollow spherically shaped cavity;
three pairs of electrically isolated electrodes each pair centered on one of three orthogonal axes intersecting at the center of said cavity and mounted on said insulative means of said housing adjacent to said cavity, with the electrodes of each pair having substantially the same area of surface exposed to said cavity and being substantially diametrically opposite to each other;
an electrically conductive substantially spherically shaped nonmagnetic inertial member positioned within said cavity; and means connected to said electrodes for establishing electric fields between said electrodes and said member so that said member is levitated free of physical contact of said electrodes, said field establishing means including an alternating constant current generating means of the same frequency connected to each of said electrodes to control the current at each of said electrodes so that the currents at the two electrodes of each pair are in a 90° phase relationship and so that if said rotor moves relative to said housing due to an external acceleration being applied to said instrument, the relative movement being the displacement of said rotor from the center of said electrode cavity toward one electrode of one of said electrode pairs, the current at said one of said electrodes decreases in magnitude by an amount proportional to said external force applied to said instrument and the current at the other electrode of said pair increases by an amount so that the vector sum of said two currents at said electrode pair is of a substantially constant magnitude and the vector sums of the currents in each of the three electrode pairs are of equal magnitude and are separated from each other in phase by 120°.

16. In an inertial instrument:
a housing having insulative means defining a generally hollow spherically shaped cavity;
three pairs of electrically isolated electrodes mounted on said insulative means of said housing and adjacent to said cavity, with said electrodes each having substantially the same area of surface exposed to said cavity, each electrode having four equal sides and four equal angles, the edges of said electrodes being segments of great circles on the spherical surface of said cavity;
an electrically conductive substantially spherically shaped nonmagnetic inertial member positioned within said cavity; and
means connected to said electrode for establishing electric fields between said electrodes and said member so that said member is levitated free of physical contact of said electrodes, said field establishing means including an alternating constant current generating means of the same frequency connected to each of said electrodes to control the current at each of said electrodes so that the currents at the two electrodes of each pair are in a 90° phase relationship and so that if said rotor moves relative to said housing due to an external acceleration being applied to said instrument, the relative movement being the displacement of said rotor from the center of said electrode cavity toward one electrode of one of said electrode pairs, the current at said one of said electrodes decreases in magnitude by an amount proportional to said external force applied to said instrument and the current at the other electrode of said pair increases by an amount so that the vector sum of said two currents at said electrode pair is of a substantially constant magnitude and the vector sums of the currents in each of the three electrode pairs are of equal magnitude and are separated from each other in phase by 120°.

17. In an inertial instrument:
a housing having insulative means defining a generally hollow spherically shaped cavity;
three pairs of electrically isolated electrodes mounted on said insulative means of said housing and adjacent to said cavity, with the electrodes of each pair having substantially the same area of surface exposed to said cavity and being arranged so that the center of the area of one electrode of each of said pairs is substantially diametrically opposite the center of the area of the other electrode of said pair;
an electrically conductive substantially spherically shaped nonmagnetic inertial member positioned within said cavity;
means connected to said electrodes for establishing electric fields between said electrodes and said member so that said member is levitated free of physical contact of said electrodes, said field establishing means including an alternating constant current generating means of the same frequency connected to each of said electrodes to control the current at each of said electrodes so that if said rotor moves relative to said housing due to an external acceleration being applied to said instrument, the relative movement being the displacement of said rotor from the center of said electrode cavity toward one electrode of one of said electrode pairs, the current at said one of said electrode decreases in magnitude by an amount proportional to said external force applied to said instrument and the current at the other electrode of said pair increases by an amount so that the vector sum of said two currents at said electrode pair is of a substantially constant magnitude and the vector sums of the currents in each of the three electrode pairs are of equal magnitude and are separated from each other in phase by 120°;
an automatic rotor sag control network connected to said electrodes provides compensating forces on the rotor to eliminate rotor sag; and
readout means connected to said electrodes of each electrode pair for detecting the magnitudes of said currents at said electrodes and providing an output signal indicative of acceleration along the axis of each electrode pair.

18. In an inertial instrument:
a housing having insulative means defining a generally hollow spherically shaped cavity;
three pairs of electrically isolated electrodes mounted on said insulative means of said housing and adjacent to said cavity, with the electrodes of each pair having substantially the same area of surface exposed to said cavity and being arranged so that the center of the area of one electrode of each of said pairs is substantially diametrically opposite the center of the area of the other electrode of said pair;
an electrically conductive substantially spherically shaped nonmagnetic inertial member positioned within said cavity;
means connected to said electrodes for establishing electric fields between said electrodes and said member so that said member is levitated free of physical contact of said electrodes, said field establishing means including an alternating constant current generating means of the same frequency connected to each of said electrodes to control the current at each of said electrodes so that if said rotor moves relative to said housing due to an external acceleration being applied to said instrument, the relative movement being the displacement of said rotor from the center of said electrode cavity toward one electrode of one of said electrode pairs, the current at said one of said electrode decreases in magnitude by an amount proportional to said external force applied to said instrument and the current at the other electrode of said pair increases by an amount so that the vector sum of said two currents at said electrode pair is of a substantially constant magnitude and the vector sums of the currents in each of the three electrode pairs are of equal magnitude and are separated from each other in phase by 120°; and
readout means connected to said electrodes of each electrode pair for detecting the magnitudes of said currents at said electrodes and providing an output signal indicative of acceleration along the axis of each electrode pair.

19. In an intertial instrument:

a housing having insulative means defining a generally hollow spherically shaped cavity;

three pairs of electrically isolated electrodes mounted on said insulative means of said housing and adjacent to said cavity, with the electrodes of each pair having substantially the same area of surface exposed to said cavity and being arranged so that the center of the area of one electrode of each of said pairs in substantially diametrically opposite the center of the area of the other electrode of said pair;

an electrically conductive substantially spherically shaped nonmagnetic inertial member positioned within said cavity;

means connected to said electrodes for establishing electric fields between said electrodes and said member so that said member is leviated free of physical contact of said electrodes, said field establishing means including an alternating constant current generating means of the same frequency connected to each of said electrodes to control the current at each of said electrodes so that if said rotor moves relative to said housing due to an external acceleration being applied to said instrument, the relative movement being the displacement of said rotor from the center of said electrode cavity toward one electrode of one of said electrode pairs, the current at said one of said electrode decreases in magnitude by an amount proportional to said external force applied to said instrument and the current at the other electrode of said pair increases by an amount so that the vector sum of said two currents at said electrode pair is of a substantially constant magnitude and the vector sums of the currents in each of the three electrode pairs are of equal magnitude and are separated from each other in phase by 120°; and an automatic rotor sag control network connected to said electrodes providing compensating forces on the rotor to eliminate rotor sag.

20. In an intertial instrument:

a housing having insulative means defining a generally hollow spherically shaped cavity;

three pairs of electrically isolated electrodes mounted on said insulative means of said housing and adjacent to said cavity, with the electrodes of each pair having substantially the same area of surface exposed to said cavity and being arranged so that the center of the area of one electrode of each of said pairs is substantially diametrically opposite the center of the area of the other alectrode of said pair;

an electrically conductive substantially spherically shaped nonmagnetic inertial member positioned within said cavity; and means connected to said electrodes for establishing electric fields between said electrodes and said member so that said member is levitated free of physical contact of said electrodes, said field establishing means including an alternating constant current generating means of the same frequency connected to each of said electrodes to control the current at each of said electrodes so that if said rotor moves relative to said housing due to an external acceleration being applied to said instrument, the relative movement being the displacement of said rotor from the center of said electrode cavity toward one electrode of one of said electrode pairs, the current at said one of said electrode decreases in magnitude by an amount proportional to said external force applied to said instrument and the current at the other electrode of said pair increases by an amount so that the vector sum of said two currents at said electrode pair is of a substantially constant magnitude and the vector sums of the currents in each of the three electrode pairs are of equal magnitude and are separated from each other in phase by 120°.

21. In an inertial instrument:

a housing having insulative means defining a generally hollow spherically shaped cavity;

three pairs of electrically isolated electrodes mounted on said insulative means of said housing and adjacent to said cavity, with the electrodes of each pair having substantially the same area of surface exposed to said cavity and being arranged so that the center of the area of one electrode of each of said pairs is substantially diametrically opposite the center of the area of the other electrode of said pair;

an electrically conductive substantially spherically shaped nonmagnetic inertial member positioned within said cavity;

means connected to said electrodes for establishing electric fields between said electrodes and said member so that said member is levitated free of physical contact of said electrodes, said field establishing means including an alternating constant current generating means of the same frequency connected to each of said electrodes to control the current at each of said electrodes so that if said rotor moves relative to said housing due to an external acceleration being applied to said instrument, the relative movement being the displacement of said rotor from the center of said electrode cavity toward one electrode of one of said electrode pairs, the current at said one of said electrode decreases in magnitude by an amount proportional to said external force applied to said instrument and the current at the other electrode of said pair increases by an amount so that the vector sum of two currents at said electrode pair is of a substantially constant magnitude and the vector sums of the currents in each of the three electrode pairs are of equal magnitude and are separated from each other in phase by 120°; and an automatic rotor sag control network means connected to each pair of said electrodes, said network means comprising, a signal generating means for providing a dither voltage signal to be added to the input signal to said current generating means, said dither voltage varying with time at a sufficiently low frequency to allow said inertial member to oscillate at said dither voltage frequency, superimposing on said electrode to rotor potentials a component of voltage varying at said frequency of said dither signal, means connected to said electrodes for measuring at the two electrodes of said pair the sum of said voltage components varying at said dither frequency, the magnitude of said sum of said voltages being proportional to said rotor sag, means connecting said voltage measuring means to said current generating means to vary the output of said current generating means in proportion to the magnitude of said rotor sag, decreasing the output of the current generator at the electrode toward which said rotor sags and increasing the output of the current generator at the electrode from which said rotor is removed due to said sag.

22. In an inertial instrument:

a housing having inslative means defining a generally hollow spherically shaped cavity;

three pairs of electrically isolated electrodes mounted on said insulative means of said housing and adjacent to said cavity, with said electrodes each having substantially the same area of surface exposed to said cavity each electrode having four equal sides and four equal angles, the edges of said electrodes being segments of great circles on the spherical surface of said cavity;

an electrically conductive substantially spherically shaped nonmagnetic inertial member positioned within said cavity; and means connected to said electrodes for establishing electric fields between said electrodes and said member so that said member is levitated free of physical contact of said electrodes, said field establishing means including an alternating constant current generating means of the same frequency to each of said electrodes to control the current at each of said electrodes so that if said rotor moves relative to said housing due to an external acceleration being applied to said instrument, the relative movement being the displacement of said rotor from the center of said electrode cavity toward one electrode of one of said electrode pairs, the current at said one of said electrodes decreases in magnitude by an amount proportional to said external force applied to said instrument and the current at the other electrode of said pair increases by an amount so that the vector sum of said two currents at said electrode pair is of a substantially constant magnitude and the vector sums of the currents in each of the three electrode pairs are of equal magnitude and are separated from each other in phase by 120°.

23. In an inertial instrument:
a housing having insulative means defining a generally hollow spherically shaped cavity;
three pairs of electrically isolated electrodes, each pair centered on one of three orthogonal axes intersecting at the center of said cavity and mounted on said insulative means of said housing adjacent to said cavity, with the electrodes of each pair having substantially the same area of surface exposed to said cavity and being substantially diametrically opposite to each other; an electrically conductive substantially spherically shaped member positioned within said cavity; and
means connected to said electrodes for establishing electrical fields between said electrodes and said member so that said member is levitated free of physical contact of said electrodes, said field establishing means including an alternating constant current generating means of the same frequency connected to each of said electrodes to control the current at each of said electrodes so that if said rotor moves relative to said housing due to an external acceleration being applied to said instrument, the relative movement being the displacement of said rotor from the center of said electrode cavity toward one electrode of one of said electrode pairs, the current at said one of said electrode decreases in magnitude by an amount proportional to said external force applied to said instrument and the current at the other electrode of said pair increases by an amount so that the vector sum of said two currents at said electrode pair is of a substantially constant magnitude and the vector sums of the currents in each of the three electrode pairs are of equal magnitude and are separated from each other in phase by 120°.

24. In an inertial instrument:
a housing having insulative means defining a generally hollow cavity;
three pairs of electrically isolated electrodes mounted on said insulative means of said housing and adjacent to said cavity, with the electrodes of each pair arranged so that one electrode of each of said pairs is substantially opposite the other electrode of said pair;
an electrically conductive inertial member positioned within said cavity; and
means connected to said electrodes for establishing electric fields between said electrodes and said member so that said member is levitated free of physical contact of said electrodes, said field establishing means including an alternating constant current generating means of the same frequency connected to each of said electrodes to control the current at each of said electrodes so that if said rotor moves relative to said housing due to an external acceleration being applied to said instrument, the relative movement being the displacement of said rotor from the center of said electrode cavity toward one electrode of one of said electrode pairs, the current at said one of said electrode decreases in magnitude by an amount proportional to said external force applied to said instrument and the current at the other electrode of said pair increases by an amount so that the vector sum of said two currents at said electrode pair is of a substantially constant magnitude and the vector sums of the currents in each of the three electrode pairs are of equal magnitude and are separated from each other in phase by 120°.

25. An inertial instrument comprising:
a housing having insulative means defining a hollow cavity;
a plurality of electrically isolated electrodes mounted on said insulative means of said housing and adjacent to said cavity;
an electrically conductive member positioned within said cavity;
means connected to said electrodes for establishing electric fields between said electrodes and said member so that said member is levitated free of physical contact of said electrodes creating an electrode to rotor gap at each said electrode, said field establishing means including means for controlling the currents at each electrode substantially independent of said electrode to rotor gap and to vary in proportion to the external forces exerted on said housing; and
means connected to said electrodes for measuring the currents at said electrodes and providing an output indicative of acceleration.

References Cited

UNITED STATES PATENTS

| | | | |
|---|---|---|---|
| 3,003,356 | 10/1961 | Nordsieck | 74—5 |
| 2,942,479 | 6/1960 | Hollamann | 73—5.7 |
| 3,065,640 | 11/1962 | Langmuir et al. | 73—5.7 |

FOREIGN PATENTS 1,062,965  8/1959  Germany.

ROBERT F. STAHL, Primary Examiner

U.S. Cl. X.R.
307—149